United States Patent
Hosokawa (10) Patent No.: US 11,935,317 B2
(45) Date of Patent: Mar. 19, 2024

(54) INFORMATION PROCESSING APPARATUS, INFORMATION PROCESSING METHOD, AND NON-TRANSITORY COMPUTER READABLE MEDIUM

(71) Applicant: KABUSHIKI KAISHA TOSHIBA, Tokyo (JP)

(72) Inventor: Akira Hosokawa, Ichikawa Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 270 days.

(21) Appl. No.: 17/010,869

(22) Filed: Sep. 3, 2020

(65) Prior Publication Data

US 2021/0295034 A1 Sep. 23, 2021

(30) Foreign Application Priority Data

Mar. 17, 2020 (JP) .................................. 2020-046619

(51) Int. Cl.
| | | |
|---|---|---|
| G06V 30/00 | (2022.01) | |
| G06V 30/412 | (2022.01) | |
| G06V 30/414 | (2022.01) | |
| G06V 30/416 | (2022.01) | |

(52) U.S. Cl.
CPC .......... G06V 30/414 (2022.01); G06V 30/412 (2022.01); G06V 30/416 (2022.01)

(58) Field of Classification Search
CPC ... G06V 30/414; G06V 30/412; G06V 30/416
See application file for complete search history.

(56) References Cited

U.S. PATENT DOCUMENTS

| 8,645,391 | B1 * | 2/2014 | Wong ....................... G06F 16/80 |
| | | | 707/758 |
| 9,116,981 | B2 * | 8/2015 | Denney ................. G06F 16/353 |
| 10,496,691 | B1 * | 12/2019 | Chen ........................ G06F 16/35 |
| 11,210,349 | B1 * | 12/2021 | Schwartz ................ G06F 16/94 |
| 2009/0077122 | A1 | 3/2009 | Fume et al. |

(Continued)

FOREIGN PATENT DOCUMENTS

| JP | 2009-75733 A | 4/2009 |
| JP | 2009-80722 A | 4/2009 |

*Primary Examiner* — Cesar B Paula
*Assistant Examiner* — David Faber
(74) *Attorney, Agent, or Firm* — Finnegan, Henderson, Farabow, Garrett & Dunner, LLP (57) ABSTRACT

An embodiment of the present invention provides an information processing apparatus that is capable of generating information about contents of a written work more accurately than conventionally possible. The information processing apparatus includes a determination device, a selector, and a generator. The determination device determines whether a first object and a first property that are mentioned in a first electronic document and that are estimated to be in an association relationship are in accordance with a definition of the association relationship between an object and a property. In a case where the first object and the first property are determined to be not in accordance with the definition, the selector selects, instead of the first object, a second object that is in the association relationship with the first property. The generator generates relationship information indicating that the first electronic document is related to the second object.

15 Claims, 8 Drawing Sheets

(56) References Cited

U.S. PATENT DOCUMENTS

| | | |
|---|---|---|
| 2009/0144335 A1* | 6/2009 | Scholz .................... G06F 9/451 |
| 2014/0282409 A1* | 9/2014 | Nassar ................ G06F 16/2365 |
| | | 717/124 |
| 2015/0019207 A1 | 1/2015 | Dou et al. |
| 2016/0140389 A1 | 5/2016 | Okamoto et al. |
| 2016/0203130 A1* | 7/2016 | Roque .................. G06F 40/205 |
| | | 707/741 |
| 2017/0169103 A1* | 6/2017 | Juneja .................... G06F 16/313 |
| 2017/0185674 A1* | 6/2017 | Tonkin .................. G06F 16/328 |
| 2017/0227951 A1 | 8/2017 | Orihara et al. |

* cited by examiner

INFORMATION PROCESSING APPARATUS, INFORMATION PROCESSING METHOD, AND NON-TRANSITORY COMPUTER READABLE MEDIUM

CROSS-REFERENCE TO RELATED APPLICATION (S)

This application is based upon and claims the benefit of priority from Japanese Patent Application No. 2020-046619, filed Mar. 17, 2020; the entire contents of which are incorporated herein by reference.

FIELD

Embodiments described herein relate generally to an information processing apparatus, an information processing method, and a non-transitory computer readable medium.

BACKGROUND

In recent years, there is a growing demand for stringent management of information. For example, a reference designation system (RDS) defined in the International Standard IEC 81346 demands that a reference code (sign) called "reference designation" is assigned to every object related to a power plant. Targets of assignment of the reference designation include, needless to say, equipment, terminals and the like constituting a power plant, and also, information pieces about the power plant, such as functions of the power plant, spaces, and signals. The targets of assignment of the code also include written works indicating information related to the power plant, such as technical documents.

As described above, there is a wide variety of management targets, and there is a demand for an apparatus for supporting such management. For example, there is a demand for an apparatus that recognizes contents of a written work, and that generates information such as the reference designation on the basis of the contents. However, an object that is not explicitly mentioned in a written work is possibly determined to be unrelated to the written work, resulting in generation of erroneous information.

DETAILED DESCRIPTION

An embodiment of the present invention provides an information processing apparatus that is capable of generating information about contents of a written work more accurately than conventionally possible.

The information processing apparatus according to the embodiment of the present invention includes a determination device, a selector, and a generator. The determination device determines whether a first object and a first property that are mentioned in a first electronic document and that are estimated to be in an association relationship are in accordance with a definition of the association relationship between an object and a property.

In a case where the first object and the first property are determined to be not in accordance with the definition, the selector selects, instead of the first object, a second object that is in the association relationship with the first property. The generator generates relationship information indicating that the first electronic document is related to the second object.

Below, a description is given of embodiments of the present invention with reference to the drawings. The present invention is not limited to the embodiments.

First Embodiment

Figure 1:
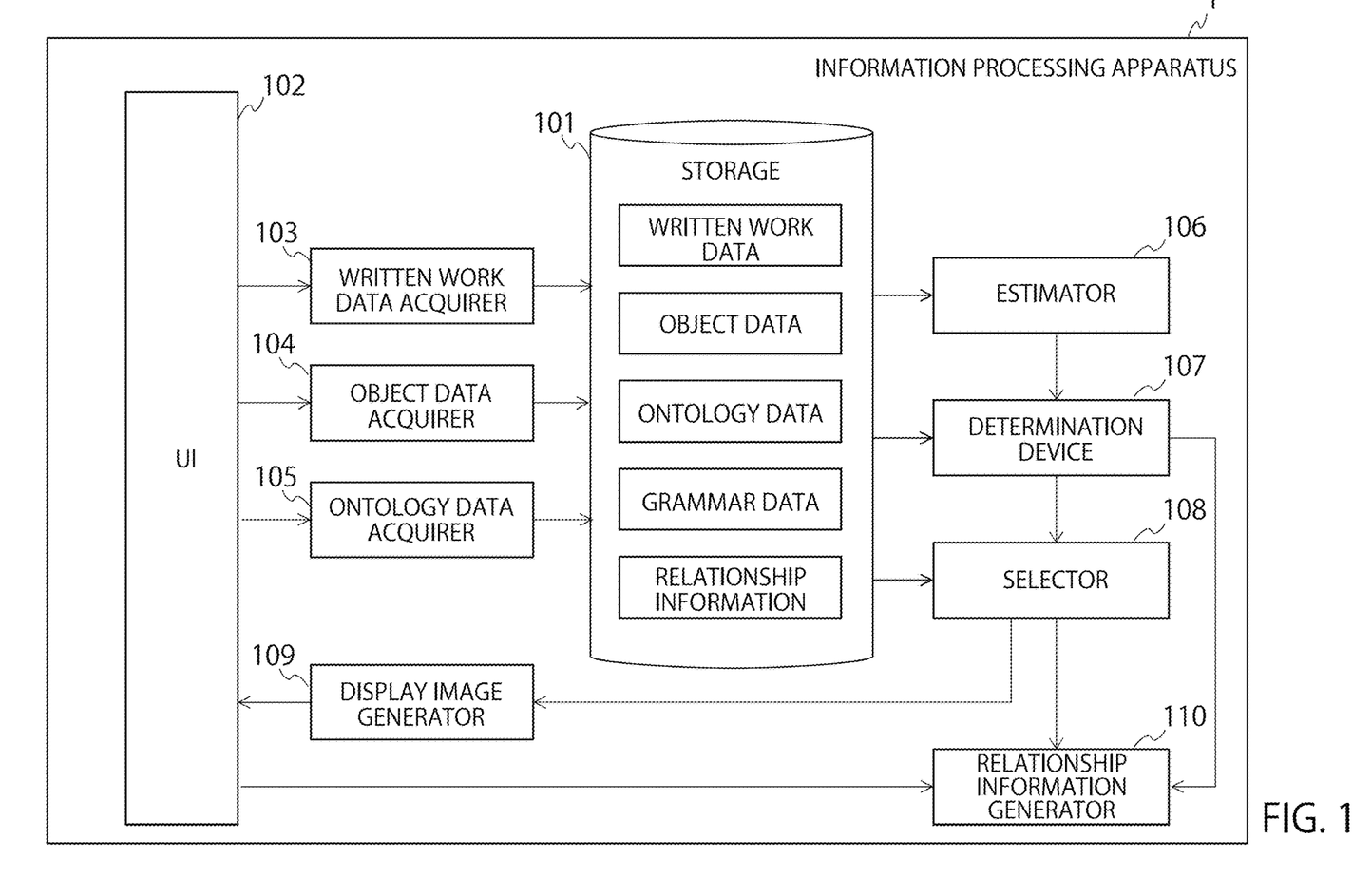
FIG. 1 is a block diagram illustrating an example of an information processing apparatus according to a first embodiment.

FIG. 1 is a block diagram illustrating an example of an information processing apparatus according to a first embodiment. An information processing apparatus 1 according to the present embodiment includes a storage 101, a user interface (UI) 102, a written work data acquirer 103, an object data acquirer 104, an ontology data acquirer 105, an estimator 106, a determination device 107, a selector 108, a display image generator 109, and a relationship information generator 110.

The information processing apparatus 1 of the present embodiment is an apparatus that generates information about an object and a property mentioned in a written work. For example, in a case where a written work includes a mention of "a first property of a first object", information indicating that the written work includes a mention of a first object and a first property is generated. When such information is generated, the object and the property mentioned in the written work may be recognized without checking contents of the written work. Furthermore, a written work which mentions specific object and property may be detected from a plurality of written works. In the following, the information will be referred to as "relationship information".

Additionally, the object and the property may be defined in various ways, but the object and the property in relation to the information processing apparatus 1 of the present embodiment are not particularly limited except that the object and the property are terms that are targets of detection from description in a written work. A term that is to be taken as an object and a term that is to be taken as a property are determined in advance. Furthermore, an association relationship between an object and a property is also determined in advance.

Furthermore, the information processing apparatus 1 may also generate a code to be assigned to the written work, on the basis of generated relationship information. The code that is to be assigned includes identifiers of the object and the property mentioned in the written work. This allows the object and the property mentioned in the written work to be recognized simply by referring to the code of the written work.

For example, International Standards IEC 81346, IEC 61355 and the like define codes that are referred to as "reference designation" and "document kind classification code (DCC)". The information processing apparatus 1 may be used to assign such codes.

However, description in a written work is expressed in such a way that it can be understood by people, and is thus not necessarily exact, and also, terms are often abbreviated, for example. Furthermore, an object and a property that are not in a relationship that is determined in advance are possibly mentioned in combination.

For example, it is assumed that an object "outlet valve" attached to "boiler No. 1" of "power generation system" is determined to be associated with a property "outlet pressure". It is also assumed that the author of the written work wrote, out of habit, from experience, or by mistake, "the set value of the outlet pressure of boiler No. 1". In this case, it is difficult for a reader of the written work to notice that the description is not strictly correct, unless he/she knows the definition of the association relationship between the object and the property. Furthermore, in this case, a code that is not in accordance with an international standard is possibly generated. Moreover, even if the description in the written work is determined to be an error, if the object "outlet valve" is not explicitly mentioned in the written work, it is difficult to generate information indicating that the written work includes a description related to "outlet valve".

However, the information processing apparatus 1 of the present embodiment recognizes even a written work which does not mention the object "outlet valve" to be a written work that is related to the object "outlet valve" and the property "outlet pressure". Details of the processing will be described together with an internal configuration of the information processing apparatus 1.

Additionally, in the present description, a document whose contents are to be recognized by the information processing apparatus 1 is referred to as "written work", and "written work" in the present description may include diagrams, tables and the like so long as sentences are written. Furthermore, the written work is assumed to be computerized to be processed by the information processing apparatus 1. A written work that is not an electronic document is assumed to be computerized by a well-known technique such as optical character recognition (OCR) before being processed by the information processing apparatus 1.

In the present description, a case where the information processing apparatus 1 uses the reference designation and the like will be described as an example for the sake of convenience. However, the code that is used by the information processing apparatus 1 does not have to be in accordance with the definition of the reference designation or the like, so long as an object, a property, or a relationship thereof is made recognizable.

The reference designation of an object is a code for identifying the object. The reference designation of an object may be expressed in two ways, and one is referred to as a single-level designation, and the other is referred to as a multi-level designation. Hereinafter, the single-level designation will be referred to as "single reference designation", and the multi-level designation as "multi-level reference designation".

The single reference designation of an object includes a prefix, a classification code, and a number. The prefix is a symbol indicating the type of the object. This allows the type of the object to be recognized from the reference designation. For example, a function is indicated by a symbol "=", equipment by a symbol "−", a location by a symbol "+", a signal by a symbol ";", and a terminal by a symbol ":". The classification code indicates a category of the object. The category is a lower-level concept of the prefix, and further categorizes the type indicated by the prefix. The classification code is added after the prefix, and is defined to have maximum three symbols. The number is an identifier for identifying the object among those belonging to a same category. The number is added after the classification code.

For example, it is assumed that there is an object "fuel system". The fuel system corresponds to the function of a power generation system, and thus, the prefix of the fuel system is "=". Furthermore, "MAA" is defined as the classification code indicating the fuel system. The number may be any number so long as there is no overlap, and "01" is used in this case. The single reference designation of the fuel system is therefore "=MAA01".

On the other hand, the multi-level reference designation indicates a structural position of an object in a system to which the object belongs. The multi-level reference designation includes the single reference designation of the object, and the single reference designation of each object including the above-mentioned object (that is, each object that is a higher-level concept of the above-mentioned object).

For example, it is assumed that there are a plurality of "units" as higher-level objects of the object "fuel system" described above. The "units" also correspond to the function of the power generation system, and the single reference designation of the first "unit" is assumed to be expressed as "=10". If the fuel system belongs to the first unit, the multi-level reference designation of the fuel system is "=10=MAA01" obtained by combining the single reference designation of the first unit and the single reference designation of the fuel system.

Furthermore, it is assumed, for example, that the fuel system described above includes boiler No. 1, whose single reference designation is "−PCA01". In this case, the multi-level reference designation of boiler No. 1 is "=10=MAA01 −PCA01".

As described above, the multi-level reference designation includes the single reference designation of a higher-level object, and thus, a system of objects may be recognized from the multi-level reference designation.

Additionally, assignment of a code called document kind classification code (DCC) to a written work is defined by IEC 61355. According to IEC 61355, the DCC also includes, like the single reference designation, a prefix, a classification code, and a number. The prefix of a written work is expressed by a symbol "&". For example, in the case where a written work is first technical specifications, the reference designation of the written work is expressed as "&EC01".

Furthermore, there is a code used for document management, that includes the reference designation of an object mentioned in a written work, the DCC of the written work, and a symbol indicating the page where the object is mentioned. Here, the code will be referred to as "document designation". The document designation is a type of the relationship information described above.

For example, it is assumed that boiler No. 1 mentioned above is mentioned on page 2 of the technical specifications mentioned above. In this case, the reference designation "=10=MAA01 −PCA01" of boiler No. 1, the DCC "&EC01" of the technical specifications, and a symbol "/p2" indicating page 2 may be combined to generate a document designation "=10=MAA01 −PCA01 &EC01/p2".

Relationship information such as the document designation enables the contents of a written work to be recognized without checking out the written work. For example, in a case where one wants to check a written work about boiler No. 1, which of a plurality of written works is a written work about boiler No. 1 may be recognized from the document designation. Moreover, the relationship information achieves advantages such as increased searchability and increased visibility of information.

Processing by the information processing apparatus 1 will be described together with an internal configuration. Structural elements of the information processing apparatus 1 illustrated in FIG. 1 may be further divided or may be aggregated. Moreover, the information processing apparatus 1 may include structural elements that are not illustrated in FIG. 1.

For example, the relationship information generator 110 may be included in an apparatus different from the information processing apparatus 1, and the information processing apparatus 1 may perform up to selection of an object described later, and the relationship information may be generated by the other apparatus.

Moreover, data to be used in the processing by the information processing apparatus 1 may be stored in a storage device such as a network storage. That is, the storage 101 may exist outside the information processing apparatus 1.

Furthermore, the UI 102 may be divided into an input device and an output device. Moreover, there may be provided a plurality of display image generators 109 for generating an image to be displayed on the UI 102. For example, a first display image generator may generate a part of a display image, and a second display image generator may generate the rest of the display image.

It is common with an information processing system to distribute processes to dedicated apparatuses in the above manner to distribute processing load and maintain availability, for example. That is, the information processing apparatus 1 may be an apparatus that operates alone, or a client-server apparatus that operates in coordination with a server on a communication network such as a cloud.

The storage 101 stores data to be used by each structural element of the information processing apparatus 1, processing results of the structural elements, and the like. In FIG. 1, flows of data between some structural elements are indicated by arrows for the sake of convenience, but exchange of data may be performed between all the structural elements.

The storage 101 may be structured as a database such as a relational database, or may be a memory or a storage that stores files in formats such as CSV and XML.

The UI 102 receives input of information that is to be used in the processing by the information processing apparatus 1, and outputs processing results of the information processing apparatus 1. The UI 102 may be a graphical user interface (GUI). The information that is to be used in the processing by the information processing apparatus 1 includes a written work for which the relationship information is to be generated. There may also be data pieces such as the object, the property, and the relationship thereof.

Additionally, a method of obtaining the information that is to be used in the processing by the information processing apparatus 1 is not particularly limited. The information may be transmitted from an EXTERNAL DEVICE, and the information processing apparatus 1 may passively receive the information. Alternatively, a path indicating a location of data may be set in the information processing apparatus 1, and the UI 102 may actively read out data in the path.

Furthermore, an output format of the UI 102 is not particularly limited. For example, the UI 102 may output an image that is generated by the display image generator 109, or may retrieve a file in which the processing result of each structural element is described from the storage 101 and output the file.

The written work data acquirer 103 acquires, from a computerized written work, text in the written work. A well-known technique may be used to read the text. Moreover, a code attached to the written work, such as the DCC, may also be acquired. Data acquired by the written work data acquirer 103 is stored in the storage 101 as written work data.

The object data acquirer 104 acquires object data. The object data is data that systematically indicates a relationship between objects in a same system.

Figure 2:
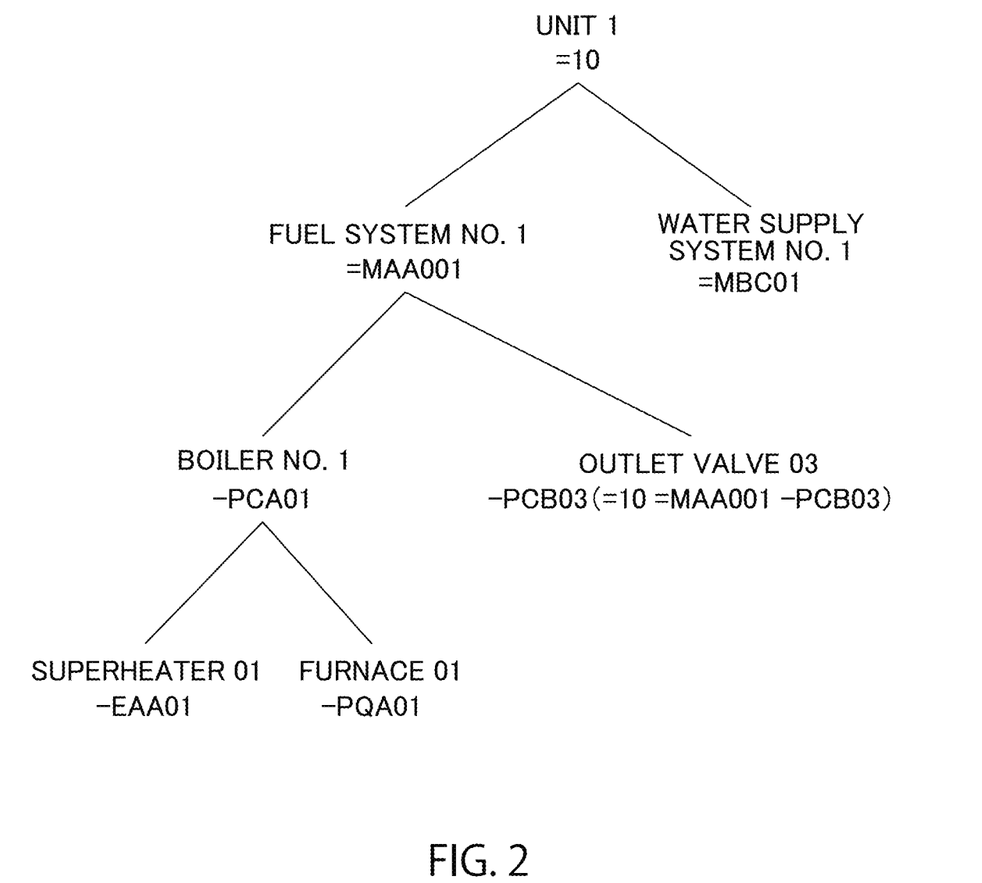
FIG. 2 is a diagram describing object data.

FIG. 2 is a diagram describing the object data. In the example in FIG. 2, a hierarchical relationship among objects is systematically indicated by tree graph data.

The object data acquirer 104 may acquire the object data from an EXTERNAL DEVICE via the UI 102. Alternatively, the object data acquirer 104 may generate and acquire the object data on the basis of data acquired via the UI 102.

For example, the object data acquirer 104 acquires data indicating the multi-level reference designation of each object. As described above, multi-level reference designation of an object indicates inclusion relationship (hierarchical relationship) of objects. That is, the relationship to each object corresponding to the single reference designation included in the multi-level reference designation may be grasped. For example, it can be grasped from the reference designation "=10=MAA01 –PCA01" of boiler No. 1 that there is "MAA01 (fuel system No. 1)" as a higher-level object of "PCA01 (boiler No. 1)".

In this manner, the object data acquirer 104 may generate the object data on the basis of data indicating a relationship to another object, such as the reference designation.

The ontology data acquirer 105 acquires ontology data. The ontology data is data that systematically indicates a relationship between a class indicating the category of an object, and a property in the class. The relationship indicated by the ontology data is taken to be correct. That is, the ontology data may be said to be a definition of an association relationship between a class and a property.

Figure 3:
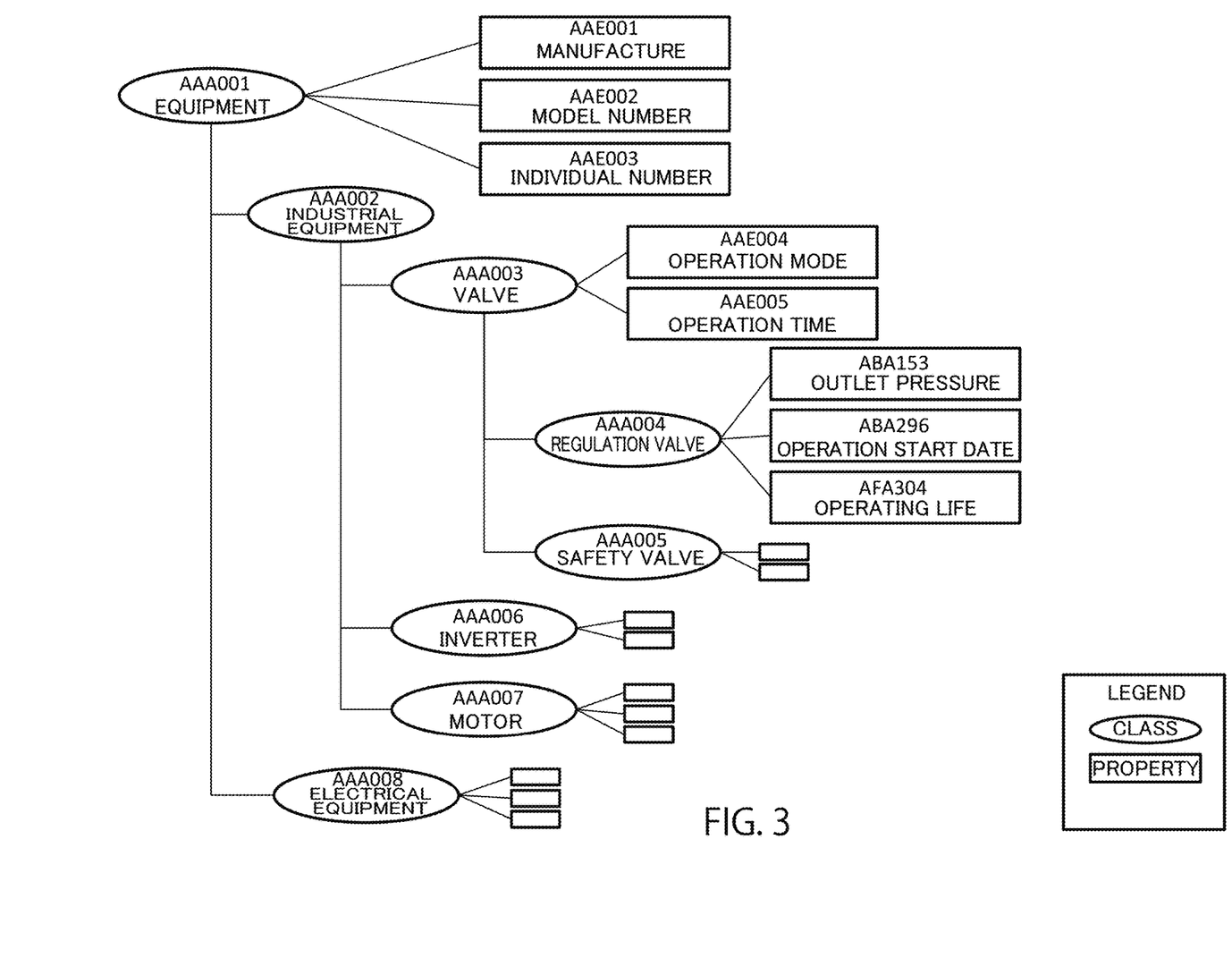
FIG. 3 is a diagram illustrating an example of an ontology.

FIG. 3 is a diagram describing the ontology data. In the example in FIG. 3, the relationships between classes and properties are systematically indicated as tree graph data. Like the classification code described above, the class indicates the category of an object, and the object is linked to a corresponding class. For example, the object "outlet valve" mentioned above is linked to a class "regulation valve" indicated by an identifier "AAA004". Accordingly, the ontology data of the example in FIG. 3 may be said to be data that systematically indicates a relationship indicating what property each object has. Additionally, in the case of acquiring the ontology data indicating the relationship between a class and a property, data indicating the object that is linked to the class is also acquired. That is, an object included in a class can be recognized.

The information processing apparatus 1 uses such ontology data as the definition (in other words, a correct answer) of the relationship between a class and a property.

Additionally, although omitted from the ontology data in FIG. 3, a class that is a lower-level concept (a lower-level class) additionally includes the property of a class that is a higher-level concept (a higher-level class). That is, the property of a class that is a higher-level concept (the higher-level class) is inherited by a class that is a lower-level concept (the lower-level class). In the example in FIG. 3, "equipment" identified by "AAA001" has three properties of "manufacturer", "model number", and "individual number". Because "regulation valve" identified by "AAA004" has "AAA001" as a parent class, "regulation valve" also has the properties "manufacturer", "model number", and "individual number".

The estimator 106 recognizes an object and a property from the object data and the ontology data, and detects an object and a property from text. For example, in relation to text "the set value of the outlet pressure of boiler No. 1", the estimator 106 detects the object "boiler No. 1" and the property "outlet pressure" on the basis of the object data and the ontology data.

The estimator 106 estimates the relationship between the object and the property that are detected. That is, the estimator 106 estimates whether or not there is a relationship between each detected object and each detected property.

A well-known technique such as natural language processing may be used in an estimation method. For example, in relation to the text "the outlet pressure of boiler No. 1" mentioned above, "boiler No. 1" may be determined by a conventional technique to modify "the outlet pressure", on the basis of grammar data for determining modification. Alternatively, a distance between detected object and property according to the natural language processing may be calculated. A distance according to the natural language processing is calculated by an arithmetic expression that uses, as a variable, presence/absence of a modification relationship between an object and a property, or presence/absence of co-occurrence in a paragraph, a diagram or the like, for example. A relationship may be determined to be present in the case where the distance according to the natural language processing is at or smaller than a predetermined value.

In this manner, the estimator 106 estimates the association relationship between an object and a property that are mentioned in a written work on the basis of description in the written work. The grammar data and the like may be stored in the storage 101 in advance.

Hereinafter, an object and a property that are estimated by the estimator 106 to be related will be referred to as an estimated object and an estimated property.

The determination device 107 determines correctness of estimation by the estimator 106. That is, the determination device 107 determines whether an estimated object and an estimated property are in accordance with the definition of the association relationship between an object and a property.

As described above, the ontology data indicates each property of the object. Accordingly, the determination device 107 may perform the determination on the basis of the ontology data.

In the case where the determination is negative, the selector 108 selects, instead of the estimated object, an object that is assumed to be in the association relationship with the estimated property.

The selector 108 extracts an object that is related to the estimated property from the ontology data. Then, a score indicating a relationship between the extracted object and the estimated object is calculated. The score will be referred to as a relationship score. In the present description, the higher the relationship score, the closer the relationship between the two objects. The selector 108 takes an object, the relationship score for which is at or greater than a predetermined value, among extracted objects, as an object candidate that is related to the estimated property.

As described above, an error easily occurs in a written work in relation to a highly related object. Therefore, a correct object (in other words, an object that is assumed to have an association relationship to the estimated property when in accordance with the definition) is considered to be highly related to the estimated object. Accordingly, in the present embodiment, an object candidate is determined on the basis of the level of relationship.

In the present embodiment, a logical distance between objects is assumed to be included as a variable of the arithmetic expression for calculating the relationship score. That is, the selector 108 calculates the logical distance between the estimated object and the object candidate. Then, the relationship score is calculated on the basis of the logical distance. Additionally, the arithmetic expression is determined such that the shorter the logical distance, the higher the relationship score.

For example, the logical distance may be a hop count in the graph theory. That is, the number of edges between two objects in the object data may be taken as the logical distance. Alternatively, points may be assigned to the edge, and a sum of points of edges between two objects may be used. The points of the edges may be adjusted as appropriate.

Processing by the selector 108 will be described with reference to FIG. 2. In a tree structure of the object data, the logical distance between objects that are connected by one edge is given as one hop. For example, fuel system No. 1 and boiler No. 1 are connected by one edge (line), and thus, the logical distance between fuel system No. 1 and boiler No. 1 is one hop. In the same manner, the logical distance between fuel system No. 1 and outlet valve 03 is one hop. The logical distance between boiler No. 1 and outlet valve 03 is two hops, because the two are connected via fuel system No. 1 that is separate by one hop from each of the two.

Additionally, a retrieval area of the selector 108 may be narrowed down in advance. For example, object estimation may be performed taking, as targets, objects, the hop counts of which from a detected object are equal to or less a than predetermined hop count. For example, when objects with two or less hops are to be taken as targets, fuel system No. 1, superheater 01, furnace 01, and outlet valve 03 are taken as the targets. Of these targets, outlet valve 03 is related to the estimated property "outlet pressure". Accordingly, the selector 108 may estimate outlet valve 03 to be the correct object.

When a plurality of object candidates are selected by the selector 108, the UI 102 outputs the object candidates. A user then recognizes the object candidates. Furthermore, the UI 102 receives a selection by the user, that is, an object candidate that is selected. For example, an image where the object candidates are displayed and which is used to receive a selection by the user may be displayed.

Figure 4:
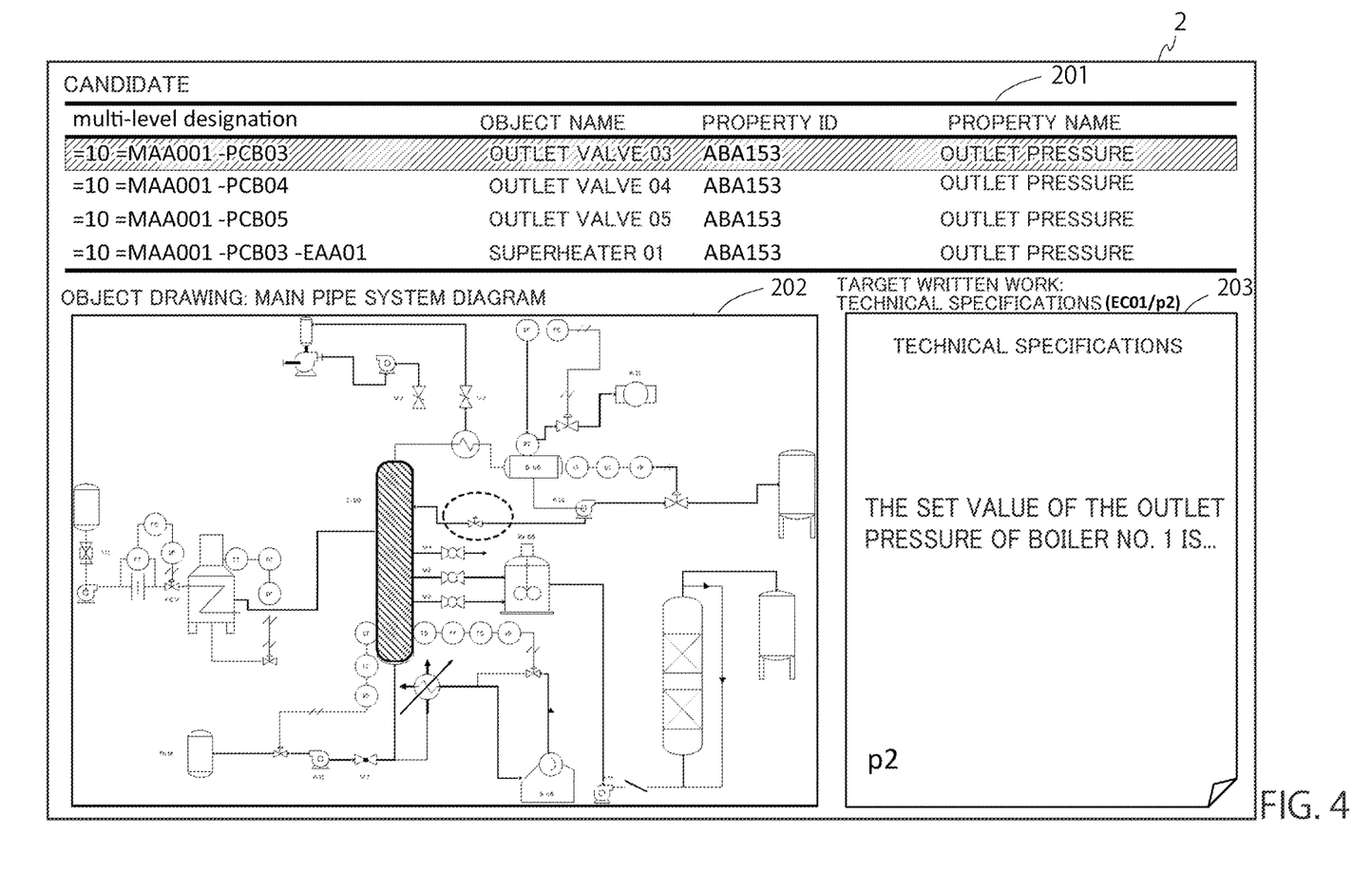
FIG. 4 is a diagram illustrating an example of a display image.

The display image generator 109 generates an image to be displayed on the UI 102. FIG. 4 is a diagram illustrating an example of a display image from the display image generator 109. A display image 2 illustrated in FIG. 4 is divided into a first area 201, a second area 202, and a third area 203.

Object candidates acquired from the selector 108 are displayed in the first area 201. The object candidates may thus be notified to the user. Additionally, the estimated property may also be displayed together with the object candidates. The display image generator 109 may also acquire codes of the object candidates and the estimated property from the storage 101 and display the same, for example.

A drawing related to objects is displayed in the second area 202. In the example in FIG. 4, a main pipe system diagram is displayed. In the case where such drawing data is acquired to acquire the object data, such a display image 2 may be displayed.

Furthermore, the display image generator 109 may process the drawing. For example, information to be used as reference for users may be displayed on the drawing. The drawing data possibly includes the identifier, a shape of a corresponding mark, and a display position of each object in the drawing. In such a case, the position where each object is drawn in an engineering drawing may be recognized. Accordingly, the display image generator 109 may display parts corresponding to the detected object and the object candidates in an emphasized manner. In the example in FIG. 4, a range corresponding to "boiler No. 1" as the detected object is emphasized by diagonal lines. Furthermore, a range corresponding to "outlet valve 03" as an object candidate is surrounded by a dotted-line frame. Moreover, a display color of an object may be changed. Selection by a user may thus be aided by displaying a drawing where candidates for the object are emphasized.

A page, of the target written work, where the detected object and property are indicated is displayed in the third area 203. Text acquired by the written work data acquirer 103 may be displayed as an image in this manner.

Additionally, text of the written work may also be processed. For example, letter strings of the detected object and property on the page may be emphasized. An emphasis method is not particularly limited. In the example in FIG. 4, the letter strings are emphasized using bold letters and underlines, but instead, the color of the letter strings may be changed or the letter strings may be surrounded by frames.

When a user determines an object from the object candidates, information about the determined object is transmitted to the relationship information generator 110. Additionally, in the example in FIG. 4, the selected object candidate is displayed in the first area 201 differently from other object candidates by being displayed with white letters on a black background.

Additionally, a well-known conventional technique may be used to generate an input/output image, and details of a display process for the input/output image, an operation method for the input/output image, and the like are omitted.

The relationship information generator 110 generates the relationship information including the object determined by the selector 108 or the UI 102, the estimated property, and the written work in which the object and the estimated property are mentioned. Additionally, the relationship information may be registered in a relational database. Alternatively, one file describing elements constituting the relationship information may be stored in the storage 101 as the relationship information.

Furthermore, the relationship information generator 110 may generate codes such as the reference designation and the document designation. That is, a code including an identification code of the determined object, an identification code of the estimated property, and an identification code of the written work may be generated as the relationship information.

Moreover, the relationship information generator 110 may include, in the relationship information, an object that is determined to be not related to the property. For example, in the case where an object that is determined to be not related to a property is a higher-level object of an object that is determined to be related to the property, the object that is determined to be not related to the property may be included in the relationship information.

The generated relationship information may be output via the UI 102 or may be used at the time of detection of a written work or the like as necessary.

Figure 5:
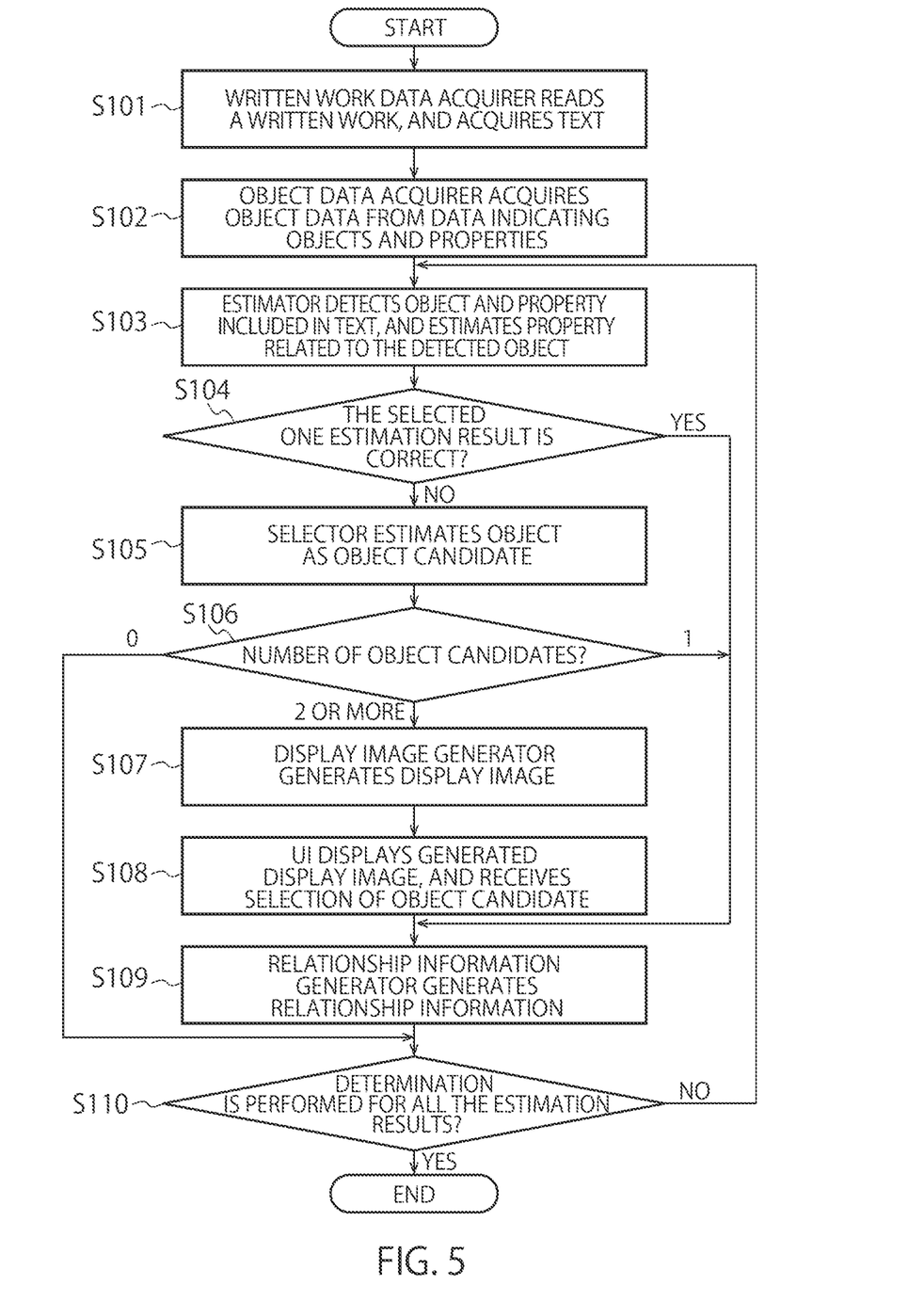
FIG. 5 is a schematic flowchart of overall processing by the information processing apparatus according to the first embodiment.

Next, a flow of processes by the structural elements will be described. FIG. 5 is a schematic flowchart of overall processing by the information processing apparatus 1 according to the first embodiment.

The written work data acquirer 103 reads a written work, and acquires text (S101). For its part, the object data acquirer 104 acquires object data from data indicating objects and properties (S102). Additionally, the process in S101 and the process in S102 are independent processes, and may be performed in parallel or in series.

The estimator 106 detects an object and a property included in the text, on the basis of the text of the written work and the object data, and estimates a property related to the detected object (S103).

The determination device 107 selects one estimation result for which determination is not yet performed, and performs determination (S104). In the case where the determination result is negative ("NO" in S104), or in other words, in the case where the estimated property is determined to be not related to the object, the selector 108 estimates an object that is related to the estimated property as an object candidate (S105).

The flow is branched according to the number of object candidates (S106). In the case where the number of object candidates is two or more ("2 or more" in S106), the display image generator 109 generates a display image for displaying the object candidates (S107). The UI 102 displays the generated display image, and receives selection of an object candidate (S108). The object to be included in the relationship information is thereby determined.

In the case where the number of object candidates is one ("1" in S106), there is no need to receive selection of the object candidate, and thus, the processes in S107 and S108 are not performed, and the object included in the relationship information is determined as the object candidate. Additionally, the processes in S107 and S108 may be performed in a case where a user is to check whether the object candidate is definitely correct or not.

In the case where the determination result is positive ("YES" in S104) and in cases where the number of object candidates is other than zero (other than "0" in S106), the object to be included in the relationship information is determined, and thus, the relationship information generator 110 generates the relationship information (S109). In the case where the number of object candidates is zero ("0" in S106), the object to be included in the relationship information is not determined, and the relationship information is not generated.

When processing of the selected estimation result is complete, whether determination is performed for all the estimation results or not is checked, and in the case where determination is not yet performed for all the estimation results ("NO" in S110), the processing returns to S103. Estimation results for which determination is not yet performed are thereby sequentially processed. Then, in the case where determination is performed for all the estimation results ("YES" in S110), the present flow is ended.

Figure 6:
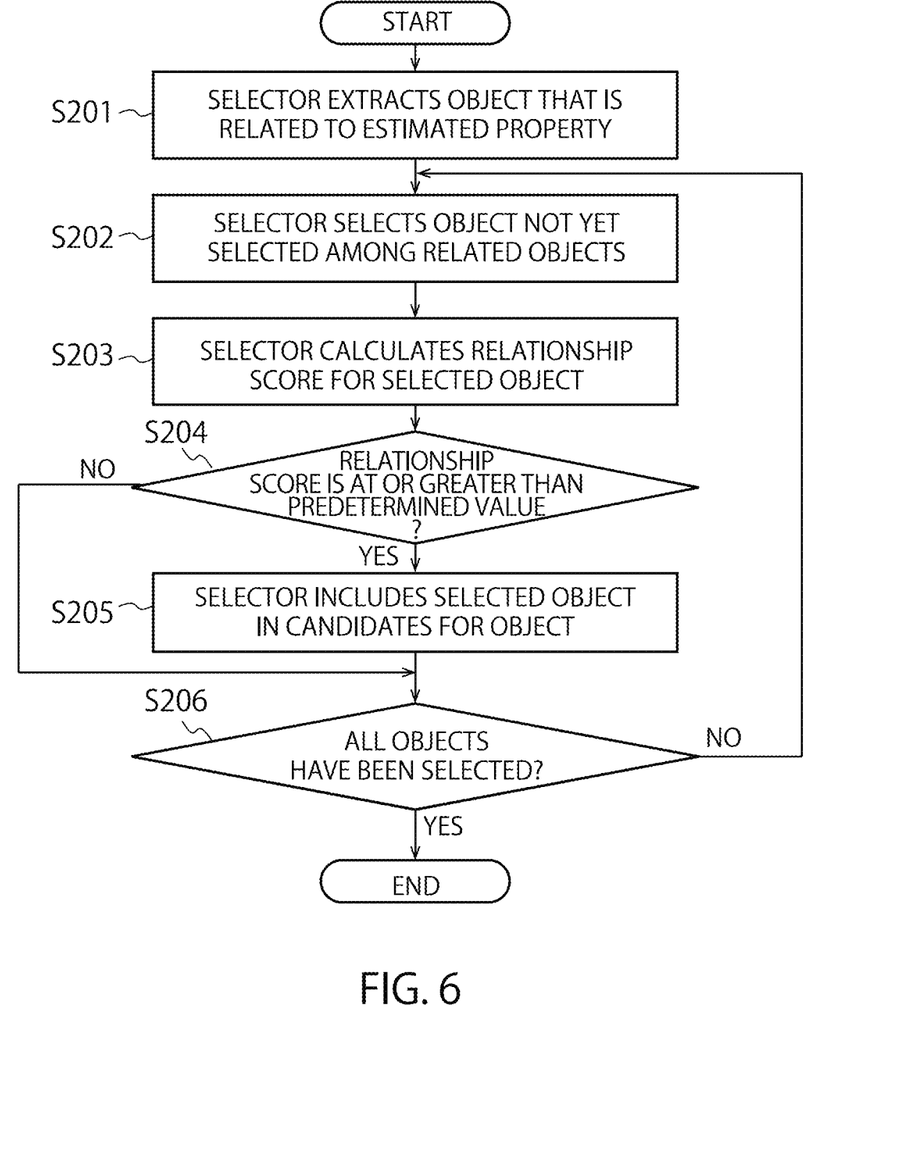
FIG. 6 is a schematic flowchart of an object estimation process according to the first embodiment.

Furthermore, a flow of an estimation process by the selector 108 will be described. FIG. 6 is a schematic flowchart of an object estimation process according to the first embodiment.

The selector 108 extracts an object that is related to an estimated property, on the basis of the object data (S201). Of the related objects, the selector 108 selects an object that is not yet selected (S202), and calculates the relationship score between the detected object and the selected object (S203).

In the case where the relationship score is at or greater than a predetermined value ("YES" in S204), the selected object is included as a candidate for the object (S205). In the case where the relationship score is smaller than the predetermined value ("NO" in S204), the selected object is not included as the candidate for the object.

In the case where there is still an object that is not yet selected ("NO" in S206), the processing returns to S202. Objects as candidates are thus determined. Then, in the case where all the objects are selected ("YES" in S206), the present flow is ended.

As described above, the information processing apparatus 1 of the present embodiment estimates and determines a relationship between an object and a property on the basis of contents of a written work, and in the case where the relationship between the object and the property is denied, the information processing apparatus 1 estimates an object to which the property is actually related. This enables an object that is not explicitly mentioned in a written work to be also recognized as an object that is related to the written work, and information indicating objects that are related to the written work may be accurately generated.

Second Embodiment

Figure 7:
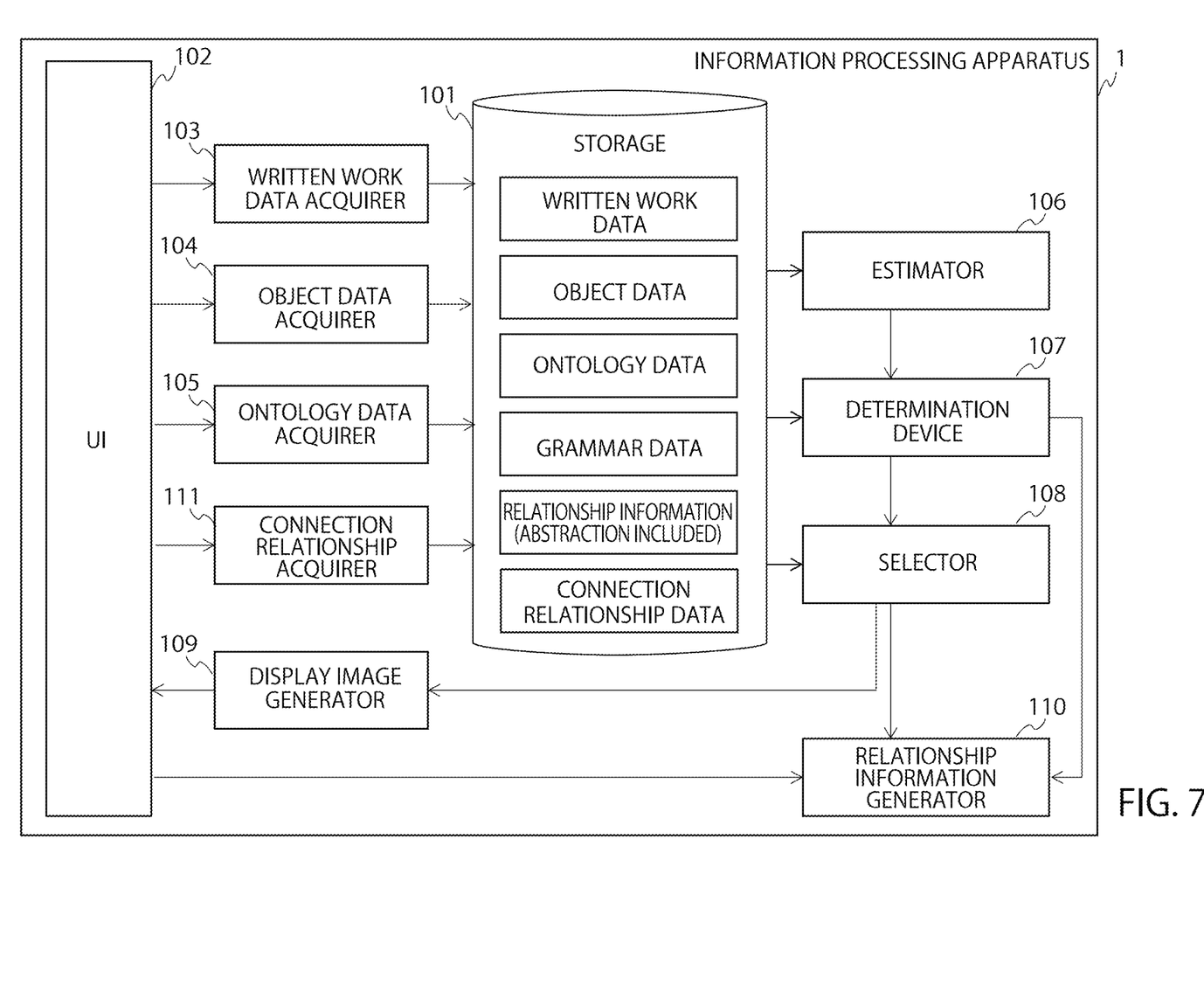
FIG. 7 is a block diagram illustrating an example of an information processing apparatus according to a second embodiment.

In a second embodiment, the information processing apparatus 1 further includes a connection relationship acquirer 111. Description of the same matters as those of the first embodiment will be omitted.

The connection relationship acquirer 111 acquires data indicating a connection relationship between objects, and recognizes presence/absence of the connection relationship to each object. For example, a physical connection relationship between objects that are connected by a pipe may be acquired on the basis of data indicating piping to each object, such as a P&ID diagram. Furthermore, a physical connection relationship between objects that are connected by an electrical wire may be acquired on the basis of data indicating wiring to each object, such as a single-line diagram.

Alternatively, objects that are in a physical connection relationship may be detected on the basis of the position of each object or data allowing a physical distance between objects to be recognized. For example, a physical distance between objects may be calculated on the basis of a drawing or a table indicating the position of each object, and presence of a physical connection relationship may be determined in a case where the physical distance is at or smaller than a predetermined threshold.

Additionally, the connection relationship may be a logical connection relationship, without being limited to the physical connection relationship. For example, there may be a restriction that, to cut off power to an object, power to another object has to be first cut off. Due to such a restriction, even if objects are not physically connected, there may be a subordination relationship in relation to processing or the like. In the case where there is such a subordination relationship, it can be said that there is a logical connection relationship.

For example, the connection relationship acquirer 111 may detect objects that are in the logical connection relationship described above, on the basis of a processing procedure manual or the like. In this case, the connection relationship acquirer 111 may read text of the processing procedure manual, recognize a restriction as described above using a well-known technique such as natural language processing, and recognize the subordination relationship between objects.

In the first embodiment, the selector 108 calculates the relationship score between a detected object and a selected object to select a candidate for the object. In the second embodiment, a variable related to the connection relationship is included in the arithmetic expression for calculating the relationship score. Additionally, the arithmetic expression for the relationship score is determined such that the more distant the connection relationship, that is, the greater the actual physical distance, the lower the relationship score. Accordingly, the greater the physical distance, the less possibility of being selected as a candidate for the object.

For example, as described above, the property "outlet pressure" is associated with the object "outlet valve". However, if there are many boilers in a same fuel system, there will be many "outlet valves". Accordingly, many objects will be extracted in association with the property "outlet pressure". However, in the case where a written work mentions "the outlet pressure of boiler No. 1", it is difficult to assume an association relationship to "outlet valve" of boiler No. 3 that is greatly separate from boiler No. 1. Accordingly, "outlet valve" of boiler No. 3 that is greatly separate from boiler No. 1 is desirably not made the candidate for the object. Therefore, the arithmetic expression for the relationship score is adjusted such that the greater the physical distance, the less possibility of being selected as a candidate for the object.

Processes other than that described above is the same as those of the first embodiment. The flowchart for the second embodiment is different from that of the first embodiment only in that the connection relationship acquirer 111 acquires the connection relationship before the determination process by the determination device 107 (S204), and description of the flowchart will be omitted.

As described above, with the information processing apparatus 1 of the present embodiment, a candidate for the object is estimated further taking into account the connection relationship of objects. Accordingly, an object that is systematically close to a detected object but is actually greatly separate from the detected object is prevented from being selected as a candidate. Information indicating an object related to the written work may thus be accurately generated.

Third Embodiment

In a third embodiment, the selector 108 estimates an object using the relationship information that is generated in the past. The third embodiment is the same as the embodiments described above in aspects other than the estimation.

The relationship information includes information, such as the single reference designation, that enables identification of an object, but the selector 108 of the present embodiment uses information that is a part of the relationship information and that indicates a category of an object, such as the classification code in the single reference designation.

At the time of calculating the relationship score, the selector 108 checks whether the relationship information about the estimated property and an object of the same category as the object for the estimation is generated in the past. That is, whether the relationship information is stored in the storage 101 is checked.

The arithmetic expression for the relationship score of the present embodiment is determined such that the relationship score is increased when the relationship information is stored in the storage 101. Accordingly, an object belonging to the same category as an object that is related to the estimated property tends to be determined to be related to the estimated property. That is, an object belonging to the same category as an object that is determined to be in the association relationship with the estimated property according to the relationship information generated in the past is preferentially included as the candidate for the object.

Additionally, in the above description, the selector 108 extracts the information indicating the category of an object from the relationship information, but the information indicating the category of an object may be extracted in advance from the relationship information. That is, the information processing apparatus 1 may further include a structural element such as an abstraction device that abstracts the relationship information after the relationship information is generated, and that causes the abstracted relationship information to be stored in the storage 101 separately from the relationship information.

The third embodiment is the same as the first and second embodiments in aspects other than the processing described above. Moreover, the only difference is in the arithmetic expression for calculating the relationship score, and the flow of processing of the third embodiment is the same as those of the first and second embodiments, and description of the flow will be omitted.

As described above, the information processing apparatus 1 of the present embodiment uses past relationship information to generate the relationship information. Accordingly, a candidate for an object that may be related may be more accurately selected.

Additionally, at least a part of the embodiments described above may be implemented by a dedicated electronic circuit (that is, hardware) such as an integrated circuit (IC) on which a processor, a memory and the like are mounted. Furthermore, at least a part of the embodiments described above may be implemented by executing software (program). For example, processes of the embodiments described above may be implemented by using a general-purpose computer apparatus as basic hardware, and by causing a processor such as a CPU mounted in the computer apparatus to execute programs.

For example, a computer may read out dedicated software that is stored in a computer-readable storage medium to serve as an apparatus of the embodiments described above. The type of the storage medium is not particularly limited. Furthermore, dedicated software downloaded from a communication network may be installed in a computer to cause the computer to serve as an apparatus of the embodiments described above. Information processing by software is thus actually implemented using hardware resources.

Figure 8:
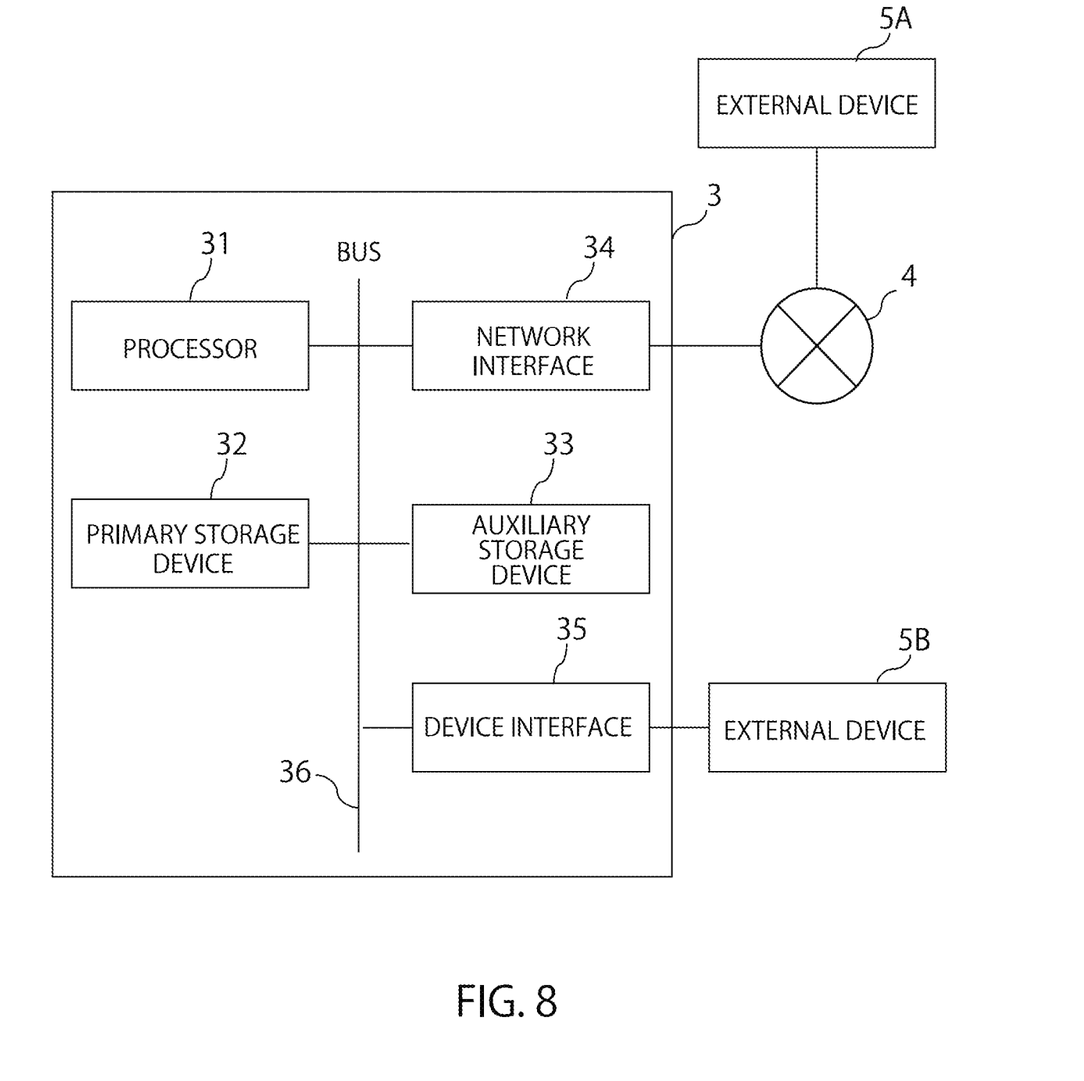
FIG. 8 is a block diagram illustrating an example of a hardware configuration according to an embodiment of the present invention.

FIG. 8 is a block diagram illustrating an example of a hardware configuration according to an embodiment of the present invention. The information processing apparatus 1 may be implemented as a computer apparatus 3 that includes a processor 31, a PRIMARY STORAGE DEVICE 32, an auxiliary storage device 33, a network interface 34, and a device interface 35, where these elements are connected by a bus 36. The storage 101 may be implemented by the PRIMARY STORAGE DEVICE 32 or the auxiliary storage device 33, and other structural elements may be implemented by the processor 31.

Additionally, the computer apparatus 3 in FIG. 8 includes one of each structural element, but may alternatively include a plurality of same structural elements. Furthermore, FIG. 8 illustrates one computer apparatus 3, but software may be installed in a plurality of computer apparatuses, and each of the plurality of computer apparatuses may perform processing according to a different part of the software.

The processor 31 is an electronic circuit including a control device and an arithmetic device of a computer. The processor 31 performs arithmetic processing using data or a program input from each device or the like of an internal configuration of the computer apparatus 3, and outputs an arithmetic result or a control signal to each device or the like. Specifically, the processor 31 executes an operating system (OS) of the computer apparatus 3, an application or the like, and controls each device constituting the computer apparatus 3. The processor 31 is not particularly limited so long as processing described above may be performed.

The PRIMARY STORAGE DEVICE 32 corresponding to a computer readable medium is a storage device storing commands to be executed by the processor 31, various pieces of data, and the like, and information stored in the PRIMARY STORAGE DEVICE 32 is directly read out by the processor 31. The auxiliary storage device 33 is a storage device other than the PRIMARY STORAGE DEVICE 32. Additionally, these storage devices refer to any electronic components capable of storing electronic information, and may be memories or storages. Furthermore, the memory may be either of a volatile memory and a non-volatile memory.

The network interface 34 is an interface for connecting to a communication network 4 in a wireless or wired manner. As the network interface 34, one that is according to an existing communication standard may be used. Exchange of information with an EXTERNAL DEVICE 5A that is communicatively connected via the communication network 4 may be performed by the network interface 34.

The device interface 35 is an interface, such as an USB, that is directly connected to an EXTERNAL DEVICE 5B. The EXTERNAL DEVICE 5B may be an external storage medium, or a storage device for a database and the like.

The EXTERNAL DEVICEes 5A and 5B may each be an output apparatus. For example, the output apparatus may be a display apparatus for displaying images, or an apparatus for outputting sound and the like. Examples of the output apparatus include a liquid crystal display (LCD), a cathode ray tube (CRT), a plasma display panel (PDP), a speaker and the like, although these are not restrictive.

Additionally, the EXTERNAL DEVICEes 5A and 5B may each be an input apparatus. The input apparatus includes devices such as a keyboard, a mouse and a touch panel, and information input by these devices is provided to the computer apparatus 3. Signals from the input apparatus are output to the processor 31.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
processing circuitry configured to:
acquire object data including data about a plurality of objects constituting a power plant and relationships between the plurality of objects;

acquire ontology data defining a plurality of association relationships between a plurality of objects and a plurality of properties, each association relationship between an object and a property indicating that the property is associated with the object;

detect, based on the object data and the ontology data, a first object and a first property that are mentioned in a first electronic document;

estimate that the first object and the first property are in an association relationship;

determine whether the estimated association relationship between the first object and the first property is defined in the ontology data;

in a case where the estimated association relationship between the first object and the first property is not defined in the ontology data:

select a plurality of object candidates that are in an association relationship with the first property based on the ontology data;

for each of the plurality of object candidates, calculate a logical distance between the each of the plurality of object candidates and the first object based on the object data, and determine a relationship score of the each of the plurality of object candidates based on the logical distance;

select, instead of the first object, a second object that is in the association relationship with the first property from the plurality of object candidates based on the relationship score, the second object being within a predetermined distance from the first object; and generate relationship information indicating that the first electronic document is related to the second object, wherein it is determined whether the first object and the first property have a relationship of a reference designation, and the second object is selected to have an inclusion relationship with the first object that is in the association relationship with the first property.

2. The information processing apparatus according to claim 1, wherein the relationship information is generated to indicate that the first electronic document is related to the second object and the first property.

3. The information processing apparatus according to claim 1, wherein the processing circuitry is further configured to estimate an association relationship between an object and a property mentioned in the first electronic document, based on a description in the first electronic document.

4. The information processing apparatus according to claim 1, wherein the processing circuitry is further configured to output information about the first electronic document as an electronic document related to the second object, based on the relationship information, in a case where the first electronic document does not include a mention of the second object.

5. The information processing apparatus according to claim 4, wherein a code including an identifier of the second object and an identifier of the first electronic document is generated, and the code is output as the information about the first electronic document.

6. The information processing apparatus according to claim 5, wherein a page number of the first electronic document in the code is included, based on a position of the first property in the first electronic document.

7. The information processing apparatus according to claim 4, wherein a code is generated to further include an identifier of the first property.

8. The information processing apparatus according to claim 1, wherein the processing circuitry is further configured to generate the ontology data based on a code attached to the first object.

9. The information processing apparatus according to claim 1, wherein the first object and a property that is a detection target are detected from the first electronic document, and a property that is related to the first object is estimated by estimating a relationship between the first object and the property that is detected, based on text of the first electronic document.

10. The information processing apparatus according to claim 1, wherein an object belonging to a same category as an object that is assumed to be in the association relationship with the first property according to the ontology data generated in past is included in the object candidates, and the second object is detected from the candidates.

11. The information processing apparatus according to claim 1, wherein the processing circuitry is further configured to:

output the plurality of object candidates, when the plurality of object candidates that are possibly the second object are discovered by estimation of the second object; and receive a selection of an object candidate from the plurality of object candidates, wherein the ontology data is generated to indicate that the first electronic document is related to the selected object candidate and the first property.

12. The information processing apparatus according to claim 11, wherein the processing circuitry is further configured to generate a first display image including text of the first electronic document, wherein text associated with at least one of the first object and the first property is detected from the text of the first electronic document, and processing to emphasize the text that is detected is performed in the first display image, and the first display image is displayed.

13. The information processing apparatus according to claim 11, wherein the processing circuitry is further configured to generate a second display image based on a drawing presenting a display object corresponding to each of the plurality of object candidates, data indicating an identifier of the display object presented in the drawing, and an identifier of the object candidate that is selected, the second display image being processed such that a display object, in the drawing, corresponding to the object candidate that is selected is emphasized, wherein the second display image is displayed.

14. An information processing method comprising:

acquiring object data including data about a plurality of objects constituting a power plant and relationships between the plurality of objects;

acquiring ontology data defining a plurality of association relationships between a plurality of objects and a plurality of properties, each association relationship between an object and a property indicating that the property is associated with the object;

detecting, based on the object data and the ontology data, a first object and a first property that are mentioned in a first electronic document;

estimating that the first object and the first property are in an association relationship;

determining whether the estimated association relationship between the first object and the first property is defined in the ontology data;

in response to determining that the estimated association relationship between the first object and the first property is not defined in the ontology data:

selecting a plurality of object candidates that are in an association relationship with the first property based on the ontology data;

for each of the plurality of object candidates, calculating a logical distance between the each of the plurality of object candidates and the first object based on the object data, and determining a relationship score of the each of the plurality of object candidates based on the logical distance;

selecting, instead of the first object, a second object that is in the association relationship with the first property from the plurality of object candidates based on the relationship score, the second object being within a predetermined distance from the first object; and     generating relationship information indicating that the first electronic document is related to the second object, wherein it is determined whether the first object and the first property have a relationship of a reference designation, and the second object is selected to have an inclusion relationship with the first object that is in the association relationship with the first property.

15. A non-transitory computer readable medium storing a program including:

acquiring object data including data about a plurality of objects constituting a power plant and relationships between the plurality of objects;

acquiring ontology data defining a plurality of association relationships between a plurality of objects and a plurality of properties, each association relationship between an object and a property indicating that the property is associated with the object;

detecting, based on the object data and the ontology data, a first object and a first property that are mentioned in a first electronic document;

estimating that the first object and the first property are in an association relationship;

determining whether the estimated association relationship between the first object and the first property is defined in the ontology data;

in response to determining that the estimated association relationship between the first object and the first property is not defined in the ontology data:

selecting a plurality of object candidates that are in an association relationship with the first property based on the ontology data;

for each of the plurality of object candidates, calculating a logical distance between the each of the plurality of object candidates and the first object based on the object data, and determining a relationship score of the each of the plurality of object candidates based on the logical distance;

selecting, instead of the first object, a second object that is in the association relationship with the first property from the plurality of object candidates based on the relationship score, the second object being within a predetermined distance from the first object; and         generating relationship information indicating that the first electronic document is related to the second object, wherein it is determined whether the first object and the first property have a relationship of a reference designation, and the second object is selected to have an inclusion relationship with the first object that is in the association relationship with the first property.

\* \* \* \* \*